United States Patent
Gao (10) Patent No.: US 10,615,855 B2
(45) Date of Patent: Apr. 7, 2020

(54) METHOD AND DEVICE FOR DETERMINING CODEBOOK

(71) Applicant: CHINA ACADEMY OF TELECOMMUNICATIONS TECHNOLOGY, Beijing (CN)

(72) Inventor: Qiubin Gao, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 0 days.

(21) Appl. No.: 15/547,061

(22) PCT Filed: Jan. 25, 2016

(86) PCT No.: PCT/CN2016/071987
§ 371 (c)(1),
(2) Date: Jul. 27, 2017

(87) PCT Pub. No.: WO2016/119655
PCT Pub. Date: Aug. 4, 2016

(65) Prior Publication Data
US 2018/0013471 A1  Jan. 11, 2018

(30) Foreign Application Priority Data
Jan. 30, 2015  (CN) .......................... 2015 1 0051389

(51) Int. Cl.
*H04B 7/04*  (2017.01)
*H04B 7/0456*  (2017.01)
*H04B 7/06*  (2006.01)

(52) U.S. Cl.
CPC ............. *H04B 7/0456* (2013.01); *H04B 7/06* (2013.01); *H04B 7/0626* (2013.01)

(58) Field of Classification Search
CPC ....... H04B 7/0456; H04B 7/06; H04B 7/0626
See application file for complete search history.

(56) References Cited

U.S. PATENT DOCUMENTS 9,621,244 B2 * 4/2017 Liu ...................... H04B 7/0456
2011/0243098 A1  10/2011 Koivisto et al.
(Continued)

FOREIGN PATENT DOCUMENTS

| CN | 102857285 A | 1/2013 |
| CN | 102938662 A | 2/2013 |

(Continued)

OTHER PUBLICATIONS

International Preliminary Report on Patentability (IPRP) for PCT/CN2016/071987, dated Apr. 10, 2017, and its English translation provided by WIPO.
(Continued)

*Primary Examiner* — Freshteh N Aghdam
(74) *Attorney, Agent, or Firm* — Ladas & Parry, LLP (57) ABSTRACT

The present disclosure provides methods and devices for determining a codebook. The method for determining a codebook includes steps of: configuring for a UE a codebook determination parameter in accordance with an antenna array parameter adopted by a base station; and transmitting the codebook determination parameter to the UE to instruct the UE to determine the codebook in accordance with the codebook determination parameter.

18 Claims, 3 Drawing Sheets

(56) References Cited

U.S. PATENT DOCUMENTS

| | | | |
|---|---|---|---|
| 2012/0328031 A1 | 12/2012 | Pajukoski et al. | |
| 2013/0272250 A1* | 10/2013 | Shimezawa | H04B 7/063 |
| | | | 370/329 |
| 2014/0177749 A1 | 6/2014 | Wu et al. | |
| 2014/0219375 A1 | 8/2014 | Zhu et al. | |
| 2015/0372729 A1* | 12/2015 | Tajima | H04B 7/0456 |
| | | | 375/267 |
| 2015/0372740 A1* | 12/2015 | Ko | H04B 7/0456 |
| | | | 370/329 |
| 2016/0329934 A1* | 11/2016 | Zhu | H04B 7/0417 |

FOREIGN PATENT DOCUMENTS

| | | |
|---|---|---|
| CN | 104009785 A | 8/2014 |
| CN | 104144006 A | 11/2014 |
| WO | 2014/119276 A1 | 8/2014 |
| WO | 2014/137203 A2 | 9/2014 |

OTHER PUBLICATIONS

From EP 16742717.8, Extended European Search Report and Search Opinion dated Apr. 4, 2018.
International Search Report for PCT/CN2016/071987, dated Apr. 11, 2016, and its English translation provided by WIPO.
Written Opinion of the International Search Authority for PCT/CN2016/071987, dated Apr. 11, 2016, and its English translation provided by Google Translate.

\* cited by examiner

Fig.1

--Prior Art--

Fig.2

--Prior Art--

Fig.3

--Prior Art--

Fig.4

--Prior Art--

METHOD AND DEVICE FOR DETERMINING CODEBOOK

CROSS-REFERENCE TO RELATED APPLICATIONS

The present application is the U.S. national phase of PCT Application No. PCT/CN2016/071987 filed on Jan. 25, 2016, which claims a priority to the Chinese patent application No. 201510051389.7 filed on Jan. 30, 2015 and entitled "method and device for determining codebook", the disclosures of which are incorporated herein by reference in their entireties.

TECHNICAL FIELD

The present disclosure relates to the field of communication technology, in particular to a method and a device for determining a codebook.

BACKGROUND

In a multi-antenna, linear-precoding system, a receiver selects an appropriate precoding matrix from a predefined set of precoding matrices in accordance with channel information, and returns an index of the selected precoding matrix in the set, just called as a codebook, to a transmitter. The transmitter then determines the corresponding precoding matrix in accordance with the received index, and performs appropriate pre-treatment on a to-be-transmitted signal using the precoding matrix, so as to improve validity and reliability of the information transmission. The codebook is a necessary element for the implementation of this procedure. The codebook needs to be designed in such a manner as to match channel distribution characteristics and minimize a performance loss due to codebook quantization, as possible. For $3^{rd}$ Generation Partnership Project (3GPP) Long Term Evolution (LTE) and Institute of Electrical and Electronic Engineers (IEEE) 802.16 standards, different codebooks have been designed with respect to different antenna amounts, different antenna patterns and different application scenarios. However, these codebooks are designed with respect to a situation where the antennas are arranged in a one-dimensional manner, i.e., they are not suitable for the antenna array where the antennas are arranged in a two-dimensional manner.

A closed-loop precoding technique has been introduced into an LTE Release 8 (Rel-8) system, so as to improve the spectral efficiency. For the closed-loop precoding technique, it is at first required to store an identical set of precoding matrices, i.e., an identical codebook, at both a base station side and a User Equipment (UE) side. A UE estimates the channel information in accordance with a cell common pilot signal, and then selects one precoding matrix from the codebook in accordance with a certain criterion. The criterion for selection may include maximum mutual information and maximum output Signal-to-Interference plus Noise Ratio (SINR). The UE returns an index of the selected precoding matrix in the codebook to a base station via an uplink channel, and this index is just a Precoding Matrix Indicator (PMI). The base station may determine the precoding matrix to be used by the UE in accordance with the received index. The precoding matrix reported by the UE may be considered as a quantized value of Channel State Information (CSI).

Figure 1:
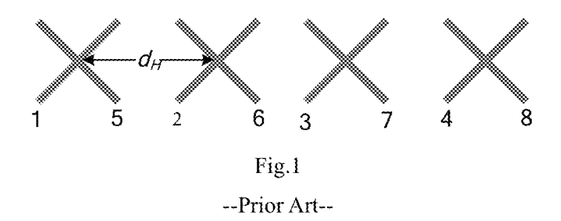
FIG. 1 is a schematic view showing conventional dual-polarization antennas arranged horizontally.
Figure 2:
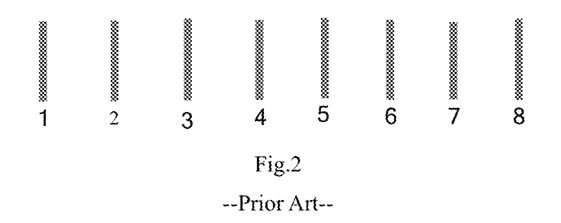
FIG. 2 is a schematic view showing conventional linear array antennas arranged horizontally.
Figure 3:
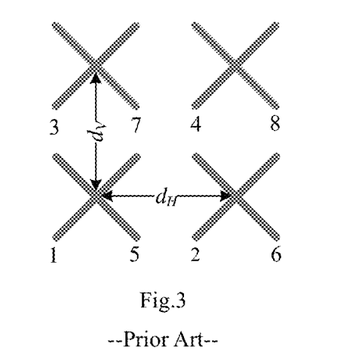
FIG. 3 is a schematic view showing the conventional dual-polarization antennas arranged horizontally and vertically.
Figure 4:
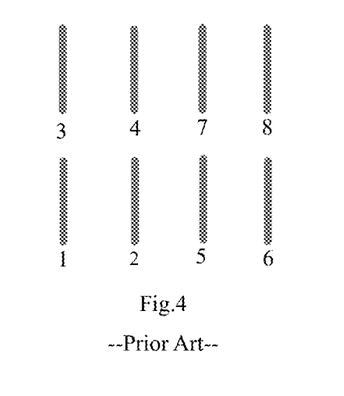
FIG. 4 is a schematic view showing the conventional linear array antennas arranged horizontally and vertically.

In a conventional cellular system, the antenna array of the base station usually includes the antennas arranged horizontally, as shown in FIGS. 1 and 2. Beams from a transmitting end of the base station is merely capable of being adjusted in a horizontal direction, and for each UE, the beam has a fixed downtilt angle in a vertical direction, so various beamforming/precoding techniques are adopted on the basis of the channel information in the horizontal direction. Actually, a radio signal is transmitted in the space in a three-dimensional manner, and it is impossible for the fixed downtilt angle to achieve the optimal system performance. The adjustment of the beams in the vertical direction plays a very important role in the improvement of the system performance. Along with the development of the antenna techniques, an active antenna where each element is capable of being controlled separately has been presented in the industry, as shown in FIGS. 3 and 4. Through this kind of two-dimensional antenna array, it is possible to dynamically adjust the beams in the vertical direction. In a Frequency Division Duplexing (FDD) system, it is necessary for the UE to report the CSI so as to achieve the beamforming/precoding technique in a three-dimensional manner. A possible method includes reporting the CSI on the basis of the codebook, just like that always adopted by the LTE Rel-8 system. However, the existing codebooks are all designed with respect to the beamforming/precoding technique in the horizontal direction, and in the case that it is directly applied to the three-dimensional beamforming/precoding technique, the system performance may be degraded.

The codebooks reported on the basis of the CSI need to match the patterns and the application scenarios of the antenna array, so as to report the CSI in an accurate manner. In a scenario where the two-dimensional antenna array is adopted, there will be a very large number of possible patterns of the antenna array. In the case that a single codebook is to be designed to meet the requirements of all possible patterns of the antenna array, the design will be very difficult, or the resultant codebook may be very large.

SUMMARY

An object of the present disclosure is to provide a method and a device for determining a codebook, so as to configure for a UE a codebook determination parameter in accordance with an antenna array parameter and enable the UE to determine a corresponding codebook in accordance with the codebook determination parameter, thereby to enable the determined codebook to be adapted to an antenna array of a base station without any excessive codebook configuration or storage overhead.

In one aspect, the present disclosure provides in some embodiments a method for determining a codebook, including steps of: configuring for a UE a codebook determination parameter in accordance with an antenna array parameter adopted by a base station; and transmitting the codebook determination parameter to the UE so as to instruct the UE to determine the codebook in accordance with the codebook determination parameter.

According to the method in the embodiments of the present disclosure, the code determination parameter may be configured for the UE at a base station side in accordance with the antenna array parameter, so as to enable the UE to determine the corresponding codebook in accordance with the codebook determination parameter, thereby to enable the determined codebook to be adapted to an antenna array of the base station without any excessive codebook configuration or storage overhead.

In a possible embodiment of the present disclosure, the code determination parameter includes information about one or more sets of matrices for determining the codebook.

In a possible embodiment of the present disclosure, the information about the one or more sets of matrices includes a value of each matrix in the set of matrices, or a relevant parameter for instructing the UE to determine each matrix in the set of matrices.

In a possible embodiment of the present disclosure, the step of configuring for the UE the codebook determination parameter in accordance with the antenna array parameter adopted by the base station includes configuring for the UE the codebook determination parameter in accordance with the number of antennas and/or an arrangement mode of the antennas in the antenna array adopted by the base station.

In a possible embodiment of the present disclosure, subsequent to the step of transmitting the codebook determination parameter to the UE, the method further includes receiving CSI reported by the UE, the CSI being determined by the UE in accordance with the codebook which is determined in accordance with the codebook determination parameter.

In a possible embodiment of the present disclosure, the CSI includes one or more PMIs corresponding to a precoding matrix. The precoding matrix is acquired through calculation on the matrix in the set of matrices, or acquired by taking the matrix in the set of matrices as a component, or acquired by taking the resulted matrix after calculation in the set of matrices as a component.

In a possible embodiment of the present disclosure, in the case that the resulted matrix after calculation in the set of matrices is taken as the component of the precoding matrix, the matrix in the set of matrices processed through a Kronecker product operation is taken as the component of the precoding matrix.

In another aspect, the present disclosure provides in some embodiments a method for determining a codebook, including steps of: receiving a codebook determination parameter configured in accordance with an antenna array parameter adopted by a base station; and determining the codebook in accordance with the codebook determination parameter.

According to the method in the embodiments of the present disclosure, the UE may determine the corresponding codebook in accordance with the code determination parameter configured in accordance with the antenna array parameter adopted by the base station, so as to enable the determined codebook to be adapted to an antenna array of the base station without any excessive codebook configuration or storage overhead.

In a possible embodiment of the present disclosure, the code determination parameter includes information about one or more sets of matrices for determining the codebook.

In a possible embodiment of the present disclosure, the information about the one or more sets of matrices includes a value of each matrix in the set of matrices, or a relevant parameter for instructing the UE to determine each matrix in the set of matrices.

In a possible embodiment of the present disclosure, the step of determining the codebook in accordance with the codebook determination parameter includes: determining the set of matrices in accordance with the information about the set of matrices; and acquiring a codeword in the codebook through calculation on a matrix in the set of matrices using a calculation rule agreed with the base station in advance, or taking the matrix in the set of matrices as a component of the codeword in the codebook, or taking the resulted matrix after calculation in the set of matrices as a component of the codeword in the codebook.

In a possible embodiment of the present disclosure, in the case that the resulted matrix after calculation in the set of matrices is taken as the component of the codeword in the codebook, the matrix in the set of matrices processed through a Kronecker product operation is taken as the component of the codeword in the codebook.

In a possible embodiment of the present disclosure, the method further includes determining CSI in accordance with the codebook and reporting the CSI to the base station, the CSI including a plurality of PMIs each corresponding to one matrix.

In yet another aspect, the present disclosure provides in some embodiments a device for determining a codebook, including: a determination unit configured to configure for a UE a codebook determination parameter in accordance with an antenna array parameter adopted by a base station; and a transmission unit configured to transmit the codebook determination parameter to the UE to instruct the UE to determine the codebook in accordance with the codebook determination parameter.

In a possible embodiment of the present disclosure, the code determination parameter includes information about one or more sets of matrices for determining the codebook.

In a possible embodiment of the present disclosure, the information about the one or more sets of matrices includes a value of each matrix in the set of matrices, or a relevant parameter for instructing the UE to determine each matrix in the set of matrices.

In a possible embodiment of the present disclosure, the determination unit is further configured to configure for the UE the codebook determination parameter in accordance with the number of antennas and/or an arrangement mode of the antennas in the antenna array adopted by the base station.

In a possible embodiment of the present disclosure, subsequent to the transmission of the codebook determination parameter to the UE, the transmission unit is further configured to receive CSI reported by the UE, the CSI being determined by the UE in accordance with the codebook which is determined in accordance with the codebook determination parameter.

In a possible embodiment of the present disclosure, the CSI includes one or more PMIs corresponding to a precoding matrix. The precoding matrix is acquired through calculation on the matrix in the set of matrices, or acquired by taking the matrix in the set of matrices as a component, or acquired by taking the resulted matrix after calculation in the set of matrices as a component.

In a possible embodiment of the present disclosure, in the case that the resulted matrix after calculation in the set of matrices is taken as the component of the precoding matrix, the matrix in the set of matrices processed through a Kronecker product operation is taken as the component of the precoding matrix.

In still yet another aspect, the present disclosure provides in some embodiments a device for determining a codebook, including: a transmission unit configured to receive a codebook determination parameter configured in accordance with an antenna array parameter adopted by a base station; and a determination unit configured to determine the codebook in accordance with the codebook determination parameter.

In a possible embodiment of the present disclosure, the code determination parameter includes information about one or more sets of matrices for determining the codebook.

In a possible embodiment of the present disclosure, the information about the one or more sets of matrices includes a value of each matrix in the set of matrices, or a relevant parameter for instructing the UE to determine each matrix in the set of matrices.

In a possible embodiment of the present disclosure, the determination unit is further configured to determine the set of matrices in accordance with the information about the set of matrices; and acquire a codeword in the codebook through calculation on a matrix in the set of matrices using a calculation rule agreed with the base station in advance, or take the matrix in the set of matrices as a component of the codeword in the codebook, or take the resulted matrix after calculation in the set of matrices as a component of the codeword in the codebook.

In a possible embodiment of the present disclosure, in the case that the resulted matrix after calculation in the set of matrices is taken by the determination unit as the component of the codeword in the codebook, the matrix in the set of matrices processed through a Kronecker product operation is taken as the component of the codeword in the codebook.

In a possible embodiment of the present disclosure, the determination unit is further configured to determine CSI in accordance with the codebook and report the CSI to the base station, the CSI including a plurality of PMIs each corresponding to one matrix.

DETAILED DESCRIPTION OF THE EMBODIMENTS

The present disclosure aims to provide a method and a device for determining a codebook, so as to configure for a UE a codebook determination parameter in accordance with an antenna array parameter and enable the UE to determine a corresponding codebook in accordance with the codebook determination parameter, thereby to enable the determined codebook to be adapted to an antenna array of a base station without any excessive codebook configuration or storage overhead.

Figure 5:
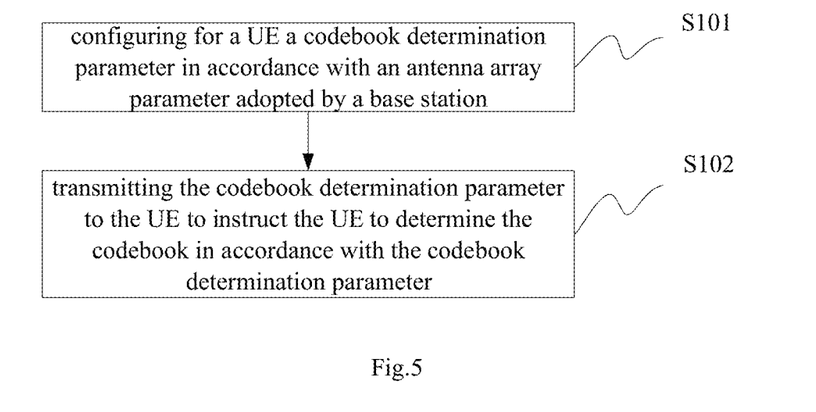
FIG. 5 is a flow chart of a method for determining a codebook at a base station side according to one embodiment of the present disclosure.

Referring to FIG. 5, at a base station side, the present disclosure provides in some embodiments a method for determining a codebook, including: Step S101 of configuring for a UE a codebook determination parameter in accordance with an antenna array parameter adopted by a base station; and Step S102 of transmitting the codebook determination parameter to the UE to instruct the UE to determine the codebook in accordance with the codebook determination parameter.

In the embodiments of the present disclosure, the antenna array parameter includes such parameters as the number of antennas and/or an arrangement mode of the antennas in an antenna array.

According to the method in the embodiments of the present disclosure, the code determination parameter may be configured for the UE at a base station side in accordance with the antenna array parameter, so as to enable the UE to determine the corresponding codebook in accordance with the codebook determination parameter, thereby to enable the determined codebook to be adapted to an antenna array of the base station without any excessive codebook configuration or storage overhead.

In a possible embodiment of the present disclosure, the code determination parameter includes information about one or more sets of matrices for determining the codebook.

In a possible embodiment of the present disclosure, the information about the one or more sets of matrices includes a value of each matrix in the set of matrices, or a relevant parameter for instructing the UE to determine each matrix in the set of matrices. In other words, in the embodiments of the present disclosure, the base station may notify the UE of the codebook determination parameter in an explicit or implicit manner.

In a possible embodiment of the present disclosure, the step of configuring for the UE the codebook determination parameter in accordance with the antenna array parameter adopted by the base station includes configuring for the UE the codebook determination parameter in accordance with the number of the antennas and/or the arrangement mode of the antennas in the antenna array adopted by the base station. To be specific, the codebook determination parameter configured for the UE may include a dimension and a value of the matrix in the set of matrices, and even the number of the sets of matrices.

In a possible embodiment of the present disclosure, subsequent to the step of transmitting the codebook determination parameter to the UE, the method further includes receiving CSI reported by the UE, the CSI being determined by the UE in accordance with the codebook which is determined in accordance with the codebook determination parameter.

Upon the reception of the CSI reported by the UE, the base station may determine the corresponding precoding matrix in accordance with the CSI, and perform appropriate pretreatment on a to-be-transmitted signal using the precoding matrix, so as to improve the validity and reliability of the information transmission. The CSI may be a PMI.

In a possible embodiment of the present disclosure, the CSI includes one or more PMIs corresponding to a precoding matrix. The precoding matrix is acquired through calculation on the matrix in the set of matrices, or acquired by taking the matrix in the set of matrices as a component, or acquired by taking the resulted matrix after calculation in the set of matrices as a component.

In a possible embodiment of the present disclosure, in the case that the resulted matrix after calculation in the set of matrices is taken as the component of the precoding matrix, the matrix in the set of matrices processed through a Kronecker product operation is taken as the component of the precoding matrix.

In a possible embodiment of the present disclosure, the base station may acquire a codeword in the codebook through calculation on the matrix in the set of matrices using a calculation rule agreed with the UE, or take the matrix in the set of matrices as a component of the codeword in the codebook, or take the resulted matrix after calculation in the set of matrices as a component of the codeword in the codebook. The codebook is a set of precoding matrices, and each element in the set is called as the codeword. The base station may establish a mapping relationship between the PMIs and the codewords in accordance with a rule agreed with the UE in advance, and determine the precoding matrix in accordance with the one or more PMIs reported by the UE and the mapping relationship.

Figure 6:
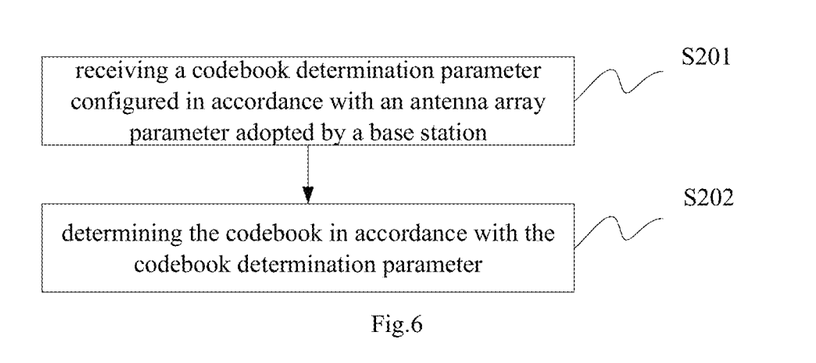
FIG. 6 is a flow chart of a method for determining a codebook at a UE side according to one embodiment of the present disclosure.

Referring to FIG. 6, the present disclosure provides in some embodiments a method for determining a codebook, including: Step S201 of receiving a codebook determination parameter configured in accordance with an antenna array parameter adopted by a base station; and Step S202 of determining the codebook in accordance with the codebook determination parameter.

According to the method in the embodiments of the present disclosure, a UE may determine the corresponding codebook in accordance with the code determination parameter configured in accordance with the antenna array parameter adopted by the base station, so as to enable the determined codebook to be adapted to an antenna array of the base station without any excessive codebook configuration or storage overhead.

In a possible embodiment of the present disclosure, the code determination parameter includes information about one or more sets of matrices for determining the codebook.

In a possible embodiment of the present disclosure, the information about the one or more sets of matrices includes a value of each matrix in the set of matrices, or a relevant parameter for instructing the UE to determine each matrix in the set of matrices.

In a possible embodiment of the present disclosure, the step of determining the codebook in accordance with the codebook determination parameter includes: determining the set of matrices in accordance with the information about the set of matrices; and acquiring a codeword in the codebook through calculation on a matrix in the set of matrices using a calculation rule agreed with the base station in advance, or taking the matrix in the set of matrices as a component of the codeword in the codebook, or taking the resulted matrix after calculation in the set of matrices as a component of the codeword in the codebook.

In a possible embodiment of the present disclosure, in the case that the resulted matrix after calculation in the set of matrices is taken as the component of the codeword in the codebook, the matrix in the set of matrices processed through a Kronecker product operation is taken as the component of the codeword in the codebook.

In a possible embodiment of the present disclosure, the method further includes determining CSI in accordance with the codebook and reporting the CSI to the base station, the CSI including a plurality of PMIs each corresponding to one matrix.

In a possible embodiment of the present disclosure, in terms of an entire system, the method in the embodiments of the present disclosure may include the following steps.

Step 1: the base station selects and configures for the UE the codebook determination parameter in accordance with the antenna array parameter. The codebook determination parameter includes one or more sets $S_n$ of matrices, where $n=1, 2, \ldots, N$, and N represents the number of the sets of matrices. Each set $S_n$ of matrices includes $M_n$ matrices, and each matrix has $L_n * C_n$ dimensions, where $L_n$ represents the number of rows of the matrix, and $C_n$ represents the number of columns of the matrix. The number of the matrix included in each set of matrices and the number of dimensions of the matrix may be selected and configured by the base station in accordance with a relevant parameter of antenna array adopted by the base station.

The sets of matrices may be configured by the base station for the UE in an explicit or implicit manner. In the case that the sets of matrices are configured in an explicit manner, the base station may transmit a value of each element in the matrix to the UE, resulting in relatively large signaling overhead, but at this time, the sets of matrices may be configured flexibly, i.e., the base station may configure the matrices for the UE arbitrarily. In the case that the sets of matrices are configured in an implicit manner, the base station may configure for the UE some parameters, and then the UE may generate the matrices through calculation in accordance with these parameters. For example, in the case that all the matrices in the set of matrices are 32 Discrete Fourier Transformation (DFT) vectors (where each matrix includes only one column), the base station may merely configure serial numbers of the 32 DFT vectors for the UE, and then the UE may calculate the corresponding matrices in accordance with the serial numbers.

For another example, the matrix is defined as a column vector and has a length of L, with a form of $$\begin{bmatrix} 1 & \exp\left(-j2\pi\frac{k}{G}\right) & \cdots & \exp\left(-j2\pi\frac{k(L-1)}{G}\right) \end{bmatrix}^T.$$

At this time, the base station merely needs to configure parameters k and G for the UE so as to enable the UE to determine one matrix, i.e., the codebook determination parameter configured by the base station for the UE is a binary group (k, G). The larger the distance between the adjacent antennas, the larger the value of k. The higher the quantization precision of the codebook, the larger the value of G. In order to configure a set of matrices (vectors) for the UE, the base station merely needs to configure for the UE a set of binary groups (k, G), e.g., {(1, 32), (2, 32), (3, 32), (4, 64)}.

Each set of matrices may include array vectors, and each array vector corresponds to one spatial direction, i.e., $$a(\theta) = \begin{bmatrix} 1 & \exp\left[-j2\pi\frac{d}{\lambda}\cos(\theta)\right] & \cdots & \exp\left[-j2\pi\frac{d}{\lambda}\cos(\theta)(L-1)\right] \end{bmatrix}^T,$$

where d represents a distance between two adjacent antenna units and it is configured by the base station for the UE, $\lambda$ represents a wavelength of a carrier, and $\theta$ represents a spatial angle corresponding to each array vector. The base station may select an appropriate set of vectors in accordance with spatial distribution of the UEs in a cell and configure it for the UEs. For example, in the case that the base station finds that the UEs are distributed within the range of 90° to 120° in a cell, it may configure for each UE the vectors corresponding to several angles within the range of 90° to 120°, e.g., {a(90), a(94), a(98), a(102), a(106), a(110), a(115), a(120)}. The base station may merely configure for each UE a set of angles θ, and then the UE may calculate the set of vectors in accordance with the set of angles θ. At this time, the UE has already known a ratio of d to λ.

Step 2: the UE receives the codebook determination parameter, i.e., the set of matrices, configured by the base station, and then determine the codebook in accordance with the set of matrices. The step of determining the codebook in accordance with the set of matrices includes: acquiring the codewords in the codebook through calculation in accordance with one or more matrices in the set of matrices using a calculation rule agreed with the base station in advance; or taking one or more matrices in the set of matrices as components of the codewords in the to codebook (e.g., in the case that the codewords in the codebook are block matrices, taking the matrices in the set of matrices as elements of the block matrix so as to determine the codeword, or transforming the matrices in the set of matrices and taking them as elements of the block matrix so as to determine the codeword); or taking a plurality of matrices in the set of matrices procesessed through calculation as the elements of the block matrix so as to determine the codeword.

Step 3: calculating and returning, by the UE, CSI in accordance with the determined codebook.

The set of matrices configured by the base station for the UE is selected and configured by the base station for the UE in accordance with the antenna array parameter, so the codebook determined in accordance with the set of matrices configured by the base station may be adapted to the antenna array adopted by the base station.

Example 1 for Determining the Codebook in Accordance with the Set of Matrices

In this example, the codebook is determined in accordance with one set of matrices, and each matrix includes merely one column, i.e., one column vector. The number of the vectors is M, and the M vectors include $V_1, V_2, \ldots,$ and $V_M$. A codebook with a rank indicator 1 may be represented as $$\begin{bmatrix} V_1 \\ V_1 \end{bmatrix}, \begin{bmatrix} V_1 \\ -V_1 \end{bmatrix}, \begin{bmatrix} V_2 \\ V_2 \end{bmatrix}, \begin{bmatrix} V_2 \\ -V_2 \end{bmatrix}, \ldots, \begin{bmatrix} V_M \\ V_M \end{bmatrix}, \begin{bmatrix} V_M \\ -V_M \end{bmatrix},$$

and it may include 2M codewords. At this time, for the UE, the number of bits for retuning a PMI with the rank indicator 1 is $\text{ceil}(\log_2(2M))$, where ceil(x) represents a minimum integer not smaller than x. A codebook with a rank indicator 2 may be represented as $$\begin{bmatrix} V_1 & V_1 \\ V_1 & -V_1 \end{bmatrix}, \begin{bmatrix} V_2 & V_2 \\ V_2 & -V_2 \end{bmatrix}, \begin{bmatrix} V_3 & V_3 \\ V_3 & -V_3 \end{bmatrix}, \ldots, \begin{bmatrix} V_M & V_M \\ V_M & -V_M \end{bmatrix},$$

and it may include M codewords. At this time, for the UE, the number of bits for returning a PMI with the rank indicator 2 is $\text{ceil}(\log_2(M))$, where ceil(x) represents a minimum integer not smaller than x. In this example, the matrix or the transformed matrix ($-V_m$) in the set of matrices may be taken as the component for the codeword in the codebook, so as to determine the codeword in the codebook, i.e., the matrix or transformed matrix in the set of matrices may be taken as an element of a block matrix so as to determine the codeword in the codebook.

Example 2 for Determining the Codebook in Accordance with the Set of Matrices

In this example, the codebook may be determined in accordance with one matrix, and each matrix includes one column, i.e., one column vector. The M vectors include $V_1, V_2, \ldots,$ and $V_M$. A codebook with a rank indicator 1 may be represented as $$\begin{bmatrix} V_1 \\ V_1 \end{bmatrix}, \begin{bmatrix} V_1 \\ -V_1 \end{bmatrix}, \begin{bmatrix} V_1 \\ jV_1 \end{bmatrix}, \begin{bmatrix} V_1 \\ -jV_1 \end{bmatrix}, \begin{bmatrix} V_2 \\ V_2 \end{bmatrix}, \begin{bmatrix} V_2 \\ -V_2 \end{bmatrix}, \begin{bmatrix} V_2 \\ jV_2 \end{bmatrix},$$
$$\begin{bmatrix} V_2 \\ -jV_2 \end{bmatrix}, \ldots, \begin{bmatrix} V_M \\ V_M \end{bmatrix}, \begin{bmatrix} V_M \\ -V_M \end{bmatrix}, \begin{bmatrix} V_M \\ jV_M \end{bmatrix}, \begin{bmatrix} V_M \\ -jV_M \end{bmatrix},$$

and it may include 4M codewords, where $j=\sqrt{-1}$. At this time, for the UE, the number of bits for returning a PMI with the rank indicator 1 is $\text{ceil}(\log_2(4M))$, where ceil(x) represents a minimum integer not smaller than x. A codebook with a rank indicator 2 may be represented as $$\begin{bmatrix} V_1 & V_1 \\ V_1 & -V_1 \end{bmatrix}, \begin{bmatrix} V_1 & V_1 \\ V_1 & -jV_1 \end{bmatrix}, \begin{bmatrix} V_2 & V_2 \\ V_2 & -V_2 \end{bmatrix},$$
$$\begin{bmatrix} V_2 & V_2 \\ V_2 & -jV_2 \end{bmatrix}, \ldots, \begin{bmatrix} V_M & V_M \\ V_M & -V_M \end{bmatrix}, \begin{bmatrix} V_M & V_M \\ V_M & -jV_M \end{bmatrix},$$

and it may include 2M codewords, where $j=\sqrt{-1}$. At this time, for the UE, the number of bits for returning a PMI with the rank indicator 2 is $\text{ceil}(\log_2(2M))$, where ceil(x) is a minimum integer not smaller than x. In this example, the matrix or the transformed matrix ($-V_m$ or $-jV_m$) in the set of matrices may be taken as the component of the codeword in the codebook so as to determine the codeword in the codebook, i.e., the matrix or transformed matrix in the set of matrices may be taken as an element of a block matrix so as to determine the codeword in the codebook.

Example 3 for Determining the Codebook in Accordance with the Sets of Matrices

In this example, the codebook may be determined in accordance with two sets of matrices, and each matrix includes one column, i.e., one column vector. The first set includes $M_1$ vectors, i.e., $V_1, V_2, \ldots,$ and $V_{M1}$, and the second set includes $M_2$ vectors, i.e., $W_1, W_2, \ldots,$ and $W_{M2}$. A codebook with a rank indicator 1 may be represented as $$\left\{ \begin{bmatrix} V_{m_1} \otimes W_{m_2} \\ V_{m_1} \otimes W_{m_2} \end{bmatrix}, \begin{bmatrix} V_{m_1} \otimes W_{m_2} \\ -V_{m_1} \otimes W_{m_2} \end{bmatrix} \right\}_{m_1=1,2,\ldots,M_1; m_2=1,2,\ldots,M_2}, \text{ or}$$

$$\left\{ \begin{bmatrix} W_{m_2} \otimes V_{m_1} \\ W_{m_2} \otimes V_{m_1} \end{bmatrix}, \begin{bmatrix} W_{m_2} \otimes V_{m_1} \\ W_{m_2} \otimes -V_{m_1} \end{bmatrix} \right\}_{m_1=1,2,\ldots,M_1; m_2=1,2,\ldots,M_2},$$

and it may include $2M_1M_2$ codewords. At this time, for the UE, the number of bits for returning a PMI with the rank indicator 1 is $\text{ceil}(\log_2(2M_1M_2))$, where ceil(x) represents a minimum integer not smaller than x. A codebook with a rank indicator 2 may be represented as $$\left\{\begin{bmatrix} V_{m_1} \otimes W_{m_2} & V_{m_1} \otimes W_{m_2} \\ V_{m_1} \otimes W_{m_2} & -V_{m_1} \otimes W_{m_2} \end{bmatrix}\right\}_{m_1=1,2,\ldots,M_1;m_2=1,2,\ldots,M_2} \text{ or}$$

$$\left\{\begin{bmatrix} W_{m_2} \otimes V_{m_1} & W_{m_2} \otimes V_{m_1} \\ W_{m_2} \otimes V_{m_1} & -W_{m_2} \otimes V_{m_1} \end{bmatrix}\right\}_{m_1=1,2,\ldots,M_1;m_2=1,2,\ldots,M_2},$$

and it may include $M_1 M_2$ codewords. At this time, for the UE, the number of bits for returning a PMI with the rank indicator 2 is $\text{ceil}(\log_2(M_1 M_2))$, where $\text{ceil}(x)$ represents a minimum integer not smaller than x. In this example, a plurality of matrices in the set of matrices processed through calculation (including a Kronecker product operation) may be taken as the components of the codeword in the codebook so as to determine the codeword in the codebook, i.e., the plurality of matrices in the set of matrices processed through calculation may be taken as elements of a block matrix so as to determine the codeword in the codebook.

Example 4 for Determining the Codebook in Accordance with the Sets of Matrices

In this example, the codebook may be determined in accordance with two sets of matrices. Each matrix in the first set is a column vector, and the first set includes $M_1$ vectors, i.e., $V_1, V_2, \ldots,$ and $V_{M1}$. Each matrix in the second set includes r columns (r>1), and the second set includes $M_2$ vectors, i.e., $W_1, W_2, \ldots,$ and $W_{M2}$. A codebook with a rank indicator r may be represented as $$\left\{\begin{bmatrix} V_{m_1} \otimes W_{m_2} \\ V_{m_1} \otimes W_{m_2} \end{bmatrix}, \begin{bmatrix} V_{m_1} \otimes W_{m_2} \\ -V_{m_1} \otimes W_{m_2} \end{bmatrix}\right\}_{m_1=1,2,\ldots,M_1;m_2=1,2,\ldots,M_2}, \text{ or}$$

$$\left\{\begin{bmatrix} W_{m_2} \otimes V_{m_1} \\ W_{m_2} \otimes V_{m_1} \end{bmatrix}, \begin{bmatrix} W_{m_2} \otimes V_{m_1} \\ -W_{m_2} \otimes V_{m_1} \end{bmatrix}\right\}_{m_1=1,2,\ldots,M_1;m_2=1,2,\ldots,M_2},$$

and it may include $2M_1 M_2$ codewords in the codebook. At this time, for the UE, the number of bits for returning a PMI with the rank indicator r is $\text{ceil}(\log_2(2M_1 M_2))$, where $\text{ceil}(x)$ represents a minimum integer not smaller than x. In this example, a plurality of matrices in the set of matrices processed through calculation (including a Kronecker product operation) may be taken as components of the codeword in the codebook so as to determine the codeword in the codebook, i.e., the plurality of matrices in the set of matrices processed through calculation may be taken as elements of a block matrix so as to determine the codeword in the codebook.

Example 5 for Determining the Codebook in Accordance with the Sets of Matrices

In this example, the codebook may be determined in accordance with R+1 sets of matrices, where R represents a maximum rank of the determined codebook. Each matrix in the first set is a column vector, and the first set includes $M_1$ vectors, i.e., $V_1, V_2, \ldots,$ and $V_{M1}$. Each matrix in the remaining R sets includes r columns (r=1, 2, ..., and R), and the set of matrices with r columns includes $N_r$ matrices, i.e., $W_{r,1}, W_{r,2}, \ldots,$ and $W_{r,N_r}$. A codebook with a rank indicator r may be represented as $$\left\{\begin{bmatrix} V_{m_1} \otimes W_{r,n_r} \\ V_{m_1} \otimes W_{r,n_r} \end{bmatrix}, \begin{bmatrix} V_{m_1} \otimes W_{r,n_r} \\ -V_{m_1} \otimes W_{r,n_r} \end{bmatrix}\right\}_{m_1=1,2,\ldots,M_1;n_r=1,2,\ldots,N_r} \text{ or}$$

$$\left\{\begin{bmatrix} W_{r,n_r} \otimes V_{m_1} \\ W_{r,n_r} \otimes V_{m_1} \end{bmatrix}, \begin{bmatrix} W_{r,n_r} \otimes V_{m_1} \\ -W_{r,n_r} \otimes V_{m_1} \end{bmatrix}\right\}_{m_1=1,2,\ldots,M_1;n_r=1,2,\ldots,N_r},$$

and it may include $2M_1 N_r$ codewords. At this time, for the UE, the number of bits for returning a PMI with the rank indicator r is $\text{ceil}(\log_2(2M_1 N_r))$, where $\text{ceil}(x)$ represents a minimum integer not smaller than x. In this example, a plurality of matrices in the sets of matrices processed through calculation (including a Kronecker product operation) may be taken as components of the codeword in the codebook so as to determine the codeword in the codebook, i.e., the plurality of matrices in the sets of matrices processed through calculation may be taken as elements of a block matrix so as to determine the codeword in the codebook.

Example 6 for Determining the Codebook in Accordance with the Sets of Matrices

In this example, the codebook may be determined in accordance with R+1 sets of matrices, where R represents a maximum rank of the determined codebook. Each matrix in the first set is a column vector, and the first set includes $M_1$ vectors, i.e., $V_1, V_2, \ldots,$ and $V_{M1}$. Each matrix in the remaining R sets includes r columns (r=1, 2, ..., and R), and the set of matrices with r columns includes $N_r$ matrices, i.e., $W_{r,1}, W_{r,2}, \ldots,$ and $W_{r,N_r}$. A codebook with a rank indicator r may be represented as $\{V_{m_1} \otimes W_{r,n_r}\}_{m_1=1, 2, \ldots, M_1; n_r=1, 2, \ldots, N_r}$ or $\{W_{r,n_r} \otimes V_{m_1}\}_{m_1=1, 2, \ldots, M_1; n_r=1, 2, \ldots, N_r}$, and it may include $M_1 N_r$ codewords. At this time, for the UE, the number of bits for returning a PMI with the rank indicator r is $\text{ceil}(\log_2(M_1 N_r))$, where $\text{ceil}(x)$ represents a minimum integer not smaller than x. In this example, a plurality of matrices in the sets of matrices processed through calculation (including a Kronecker product operation) may be used to determine the codeword in the codebook.

Example 7 for Determining the Codebook in Accordance with the Sets of Matrices

In this example, the codebook may be determined in accordance with R+1 sets of matrices, where R represents a maximum rank of the determined codebook. Each matrix in the first set is a column vector, and the first set includes $M_1$ vectors, i.e., $V_1, V_2, \ldots,$ and $V_{M1}$. Each matrix in the remaining R sets includes r columns (r=1, 2, ..., and R), and the set of matrices with r columns is just a codebook defined in an LTE protocol or any other protocol. In the case that the base station configures for the UE the set of matrices, it is merely necessary to indicate the UE to use a codebook set in the protocol (implicit configuration), e.g., to use a 2-port, 4-port or 8-port codebook. The set of matrices with r columns includes $N_r$ matrices, i.e., $W_{r,1}, W_{r,2}, \ldots,$ and $W_{r,N_r}$. A codebook with a rank indicator r may be represented as $$\left\{\begin{bmatrix} V_{m_1} \otimes W_{r,n_r} \\ V_{m_1} \otimes W_{r,n_r} \end{bmatrix}, \begin{bmatrix} V_{m_1} \otimes W_{r,n_r} \\ -V_{m_1} \otimes W_{r,n_r} \end{bmatrix}\right\}_{m_1=1,2,\ldots,M_1;n_r=1,2,\ldots,N_r} \text{ or}$$

$$\left\{\begin{bmatrix} W_{r,n_r} \otimes V_{m_1} \\ W_{r,n_r} \otimes V_{m_1} \end{bmatrix}, \begin{bmatrix} W_{r,n_r} \otimes V_{m_1} \\ -W_{r,n_r} \otimes V_{m_1} \end{bmatrix}\right\}_{m_1=1,2,\ldots,M_1;n_r=1,2,\ldots,N_r},$$

and it may include $2M_1 N_r$ codewords. At this time, for the UE, the number of bits for returning a PMI with the rank indicator r is $\text{ceil}(\log_2(2M_1 N_r))$, where $\text{ceil}(x)$ represents a minimum integer not smaller than x. In this example, a plurality of matrices in the sets of matrices processed through calculation (including a Kronecker product operation) may be taken as components of the codeword in the codebook so as to determine the codeword in the codebook, i.e., the plurality of matrices in the sets of matrices processed through calculation may be taken as elements of a block matrix so as to determine the codeword in the codebook.

Example 8 for Determining the Codebook in Accordance with the Sets of Matrices

In this example, the codebook may be determined in accordance with R+1 sets of matrices, where R represents a maximum rank of the determined codebook. Each matrix in the first set is a column vector, and the first set includes $M_1$ vectors, i.e., $V_1, V_2, \ldots,$ and $V_{M1}$. Each matrix in the remaining R sets includes r columns (r=1, 2, . . . , and R), and the set of matrices with r columns is just a codebook defined in an LTE protocol or any other protocol. In the case that the base station configures for the UE the set of matrices, it is merely necessary to indicate the UE to use a codebook set in the protocol (implicit configuration), e.g., to use a 2-port, 4-port or 8-port codebook. The set of matrices with r columns includes $N_r$ matrices, i.e., $W_{r,1}, W_{r,2}, \ldots,$ and $W_{r,Nr}$. A codebook with a rank indicator r may be represented as, $\{V_{m_1} \otimes W_{r,n_r}\}_{m_1=1, 2, \ldots, M_1; n_r=1, 2, \ldots, N_r}$ or $\{W_{r,n_r} \otimes V_{m_1}\}_{m_1=1, 2, \ldots, M_1; n_r=1, 2, \ldots, N_r}$, and it may include $M_1 N_r$ codewords. At this time, for the UE, the number of bits for returning a PMI with the rank indicator r is $ceil(log_2(M_1 N_r))$, where $ceil(x)$ represents a minimum integer not smaller than x. In this example, a plurality of matrices in the sets of matrices processed through calculation (including a Kronecker product operation) may be used to determine the codeword in the codebook.

Example 9 for Determining the Codebook in Accordance with the Set of Matrices

In this example, the codebook may be determined in accordance with one set of matrices, and each matrix includes merely one column, i.e., one column vector. The number of the vectors is M, and the M vectors include $V_1, V_2, \ldots,$ and $V_M$. A codebook with a rank indicator 1 may be represented as $$\left\{ \begin{bmatrix} V_m \\ \varphi_q V_m \end{bmatrix} \right\}_{m=1,\ldots,M; q=1,\ldots,Q},$$

where values of Q and $\varphi_q$ are constant values agreed by the base station with the UE, e.g., specified in the protocol (e.g., Q=4 and $\varphi_q = exp(j\pi q/2)$), and $j=\sqrt{-1}$. The codebook with the rank indicator 1 may include QM codewords. At this time, for the UE, the number of bits for retuning a PMI with the rank indicator 1 is $ceil(log_2(QM))$, where $ceil(x)$ represents a minimum integer not smaller than x.

A codebook with a rank indicator 2 may be represented as $$\left\{ \begin{bmatrix} V_m & V_{m'} \\ \varphi_q V_m & -\varphi_q V_{m'} \end{bmatrix} \right\}_{\substack{m=1,\ldots,M; \\ m'=1,\ldots,M; \\ q=1,\ldots,Q}},$$

and it may include $(QM^2)$ codewords. At this time, for the UE, the number of bits for retuning a PMI with the rank indicator 2 is $ceil(log_2(QM^2))$, where $ceil(x)$ represents a minimum integer not smaller than x.

The codebook with the rank indicator 2 may also be a subset of the above-mentioned codebook, e.g., $$\left\{ \begin{bmatrix} V_m & V_{m'} \\ \varphi_q V_m & -\varphi_q V_{m'} \end{bmatrix} \right\}_{\substack{m=1,\ldots,M; \\ q=1,\ldots,Q; \\ m'=[m \bmod M]+1}},$$

or a set $$\left\{ \begin{bmatrix} V_m & V_{m'} \\ \varphi_q V_m & -\varphi_q V_{m'} \end{bmatrix} \right\}_{\substack{m=1,\ldots,M; \\ q=1,\ldots,Q; \\ m'=[m \bmod M]+1}} \cup \left\{ \begin{bmatrix} V_m & V_m \\ \varphi_q V_m & -\varphi_q V_m \end{bmatrix} \right\}_{\substack{m=1,\ldots,M; \\ q=1,\ldots,Q}},$$

where $A \cup B$ represents a union of a set A and a set B.

Example 10 for Determining the Codebook in Accordance with the Sets of Matrices

In this example, the codebook may be determined in accordance with two sets of matrices, and each matrix includes one column, i.e., one column vector. The first set includes M vectors, i.e., $V_1, V_2, \ldots,$ and $V_M$, and the second set includes K vectors, i.e., $W_1, W_2, \ldots,$ and $W_K$. A codebook with a rank indicator 1 may be represented as $$\left\{ \begin{bmatrix} V_m \otimes W_k \\ \varphi_q V_m \otimes W_k \end{bmatrix} \right\}_{\substack{m=1,\ldots,M; \\ k=1,\ldots,K; \\ q=1,\ldots,Q}}, \text{ or } \left\{ \begin{bmatrix} W_k \otimes V_m \\ \varphi_q W_k \otimes V_m \end{bmatrix} \right\}_{\substack{m=1,\ldots,M; \\ k=1,\ldots,K; \\ q=1,\ldots,Q}},$$

where values of Q and $\varphi_q$ are constant values agreed by the base station with the UE, e.g., specified in the protocol (e.g., Q=4 and $\varphi_q = exp(j\pi q/2)$), and $j=\sqrt{-1}$. The codebook with the rank indicator 1 may include QMK codewords. At this time, for the UE, the number of bits for returning a PMI with the rank indicator 1 is $ceil(log_2(QMK))$, where $ceil(x)$ represents a minimum integer not smaller than x. A codebook with a rank indicator 2 may be represented as $$\left\{ \begin{bmatrix} V_m \otimes W_k & V_{m'} \otimes W_k \\ \varphi_q V_m \otimes W_k & -\varphi_q V_{m'} \otimes W_k \end{bmatrix} \right\}_{\substack{m=1,\ldots,M; \\ m'=1,\ldots,M; \\ k=1,\ldots,K; \\ q=1,\ldots,Q}} \text{ or }$$

$$\left\{ \begin{bmatrix} W_k \otimes V_m & W_k \otimes V_{m'} \\ \varphi_q W_k \otimes V_m & -\varphi_q W_k \otimes V_{m'} \end{bmatrix} \right\}_{\substack{m=1,\ldots,M; \\ m'=1,\ldots,M; \\ k=1,\ldots,K; \\ q=1,\ldots,Q}},$$

and it may include $(QM^2K)$ codewords. At this time, for the UE, the number of bits for returning a PMI with the rank indicator 1 is $ceil(log_2(QM^2K))$, where $ceil(x)$ represents a minimum integer not smaller than x.

The codebook with the rank indicator 2 may also be a subset of the above-mentioned codebook, e.g., $$\left\{ \begin{bmatrix} V_m \otimes W_k & V_{m'} \otimes W_k \\ \varphi_q V_m \otimes W_k & -\varphi_q V_{m'} \otimes W_k \end{bmatrix} \right\}_{\substack{m=1,\ldots,M;\\ m'=(m \bmod M)+1;\\ k=1,\ldots,K;\\ q=1,\ldots,Q}} \text{or}$$

$$\left\{ \begin{bmatrix} W_k \otimes V_m & W_k \otimes V_{m'} \\ \varphi_q W_k \otimes V_m & -\varphi_q W_k \otimes V_{m'} \end{bmatrix} \right\}_{\substack{m=1,\ldots,M;\\ m'=(m \bmod M)+1;\\ k=1,\ldots,K;\\ q=1,\ldots,Q}},$$

or it may also be a set $$\left\{ \begin{bmatrix} V_m \otimes W_k & V_{m'} \otimes W_k \\ \varphi_q V_m \otimes W_k & -\varphi_q V_{m'} \otimes W_k \end{bmatrix} \right\}_{\substack{m=1,\ldots,M;\\ m'=(m \bmod M)+1;\\ k=1,\ldots,K;\\ q=1,\ldots,Q}} \cup$$

$$\left\{ \begin{bmatrix} V_m \otimes W_k & V_m \otimes W_k \\ \varphi_q V_m \otimes W_k & -\varphi_q V_m \otimes W_k \end{bmatrix} \right\}_{\substack{m=1,\ldots,M;\\ k=1,\ldots,K;\\ q=1,\ldots,Q}}$$

or $$\left\{ \begin{bmatrix} W_k \otimes V_m & W_k \otimes V_{m'} \\ \varphi_q W_k \otimes V_m & -\varphi_q W_k \otimes V_{m'} \end{bmatrix} \right\}_{\substack{m=1,\ldots,M;\\ m'=(m \bmod M)+1;\\ k=1,\ldots,K;\\ q=1,\ldots,Q}} \cup$$

$$\left\{ \begin{bmatrix} W_k \otimes V_m & W_k \otimes V_m \\ \varphi_q W_k \otimes V_m & -\varphi_q W_k \otimes V_m \end{bmatrix} \right\}_{\substack{m=1,\ldots,M;\\ k=1,\ldots,K;\\ q=1,\ldots,Q}},$$

where $A \cup B$ represents a union of a set A and a set B.

Example 11 for Determining the Codebook in Accordance with the Sets of Matrices

In this example, the codebook may be determined in accordance with R+1 sets of matrices, where R represents a maximum rank of the determined codebook. Each matrix in the first set is a diagonal matrix, and the first set includes $M_1$ matrices, i.e., $V_1, V_2, \ldots$, and $V_{M1}$. Each matrix in the remaining R sets includes r columns (r=1, 2, . . . , and R), and the set of matrices with r columns is just a codebook defined in an LTE protocol or any other protocol. In the case that the base station configures for the UE the set of matrices, it is merely necessary to indicate the UE to use a codebook set in the protocol (implicit configuration), e.g., to use a 2-port, 4-port or 8-port codebook. In a possible embodiment of the present disclosure, the matrix including r columns may be configured by the base station for the UE. The set of matrices with r columns includes $N_r$ matrices, i.e., $W_{r,1}, W_{r,2}, \ldots$, and $W_{r,N_r}$. A codebook with a rank indicator r may be represented as $\{V_{m_1} \cdot W_{r,n_r}\}_{m_1=1, 2, \ldots, M_1; n_r=1, 2, \ldots, N_r}$ or $\{W_{r,n_r} \cdot V_{m_1}\}_{m_1=1, 2, \ldots, M_1; n_r=1, 2, \ldots, N_r}$, and it may include $M_1 N_r$ codewords. At this time, for the UE, the number of bits for returning a PMI with the rank indicator r is $\text{ceil}(\log_2(M_1 N_r))$, where ceil(x) represents a minimum integer not smaller than x. In this example, a plurality of matrices in the sets of matrices processed through calculation (including a matrix product operation) may be used to determine the codeword in the codebook.

Example 12 for Determining the Codebook in Accordance with the Sets of Matrices

In this example, the codebook may be determined in accordance with R+1 sets of matrices, where R represents a maximum rank of the determined codebook. Each matrix in the first set is a diagonal matrix, and the first set includes $M_1$ matrices, i.e., $V_1, V_2, \ldots$, and $V_{M1}$. Each matrix in the remaining R sets includes r columns (r=1, 2, . . . , and R), and the set of matrices with r columns is just a codebook defined in an LTE protocol or any other protocol. In the case that the base station configures for the UE the set of matrices, it is merely necessary to indicate the UE to use a codebook set in the protocol (implicit configuration), e.g., to use a 2-port, 4-port or 8-port codebook. In a possible embodiment of the present disclosure, the matrix including r columns may be configured by the base station for the UE in an explicit manner. The set of matrices with r columns includes $N_r$ matrices, i.e., $W_{r,1}, W_{r,2}, \ldots$, and $W_{r,N_r}$. A codebook with a rank indicator r may be represented as, $$\left\{ \begin{bmatrix} V_{m_1} \cdot W_{r,n_r} \\ V_{m_1} \cdot W_{r,n_r} \end{bmatrix}, \begin{bmatrix} V_{m_1} \cdot W_{r,n_r} \\ -V_{m_1} \cdot W_{r,n_r} \end{bmatrix} \right\}_{m_1=1,2,\ldots,M_1; n_r=1,2,\ldots,N_r} \text{or}$$

$$\left\{ \begin{bmatrix} W_{r,n_r} \cdot V_{m_1} \\ W_{r,n_r} \cdot V_{m_1} \end{bmatrix}, \begin{bmatrix} W_{r,n_r} \cdot V_{m_1} \\ -W_{r,n_r} \cdot V_{m_1} \end{bmatrix} \right\}_{m_1=1,2,\ldots,M_1; n_r=1,2,\ldots,N_r},$$

and it may include $2M_1 N_r$ codewords. At this time, for the UE, the number of bits for returning a PMI with the rank indicator r is $\text{ceil}(\log_2(2M_1 N_r))$, where ceil(x) represents a minimum integer not smaller than x. In this example, a plurality of matrices in the sets of matrices processed through calculation (including a matrix product operation) may be taken as components of the codeword in the codebook so as to determine the codeword in the codebook, i.e., the plurality of matrices in the sets of matrices processed through calculation may be taken as elements of a block matrix so as to determine the codeword in the codebook.

Example 13 for Determining the Codebook in Accordance with the Sets of Matrices

In this example, the codebook may be determined in accordance with two sets of matrices. Each matrix in the first set is a column vector, and the first set includes $M_1$ vectors, i.e., $V_1, V_2, \ldots$, and $V_{M1}$. Each matrix in the second set is a diagonal matrix, and the second set includes $M_2$ matrices, i.e., $W_1, W_2, \ldots$, and $W_{M2}$. A codebook with a rank indicator 1 may be represented as $$\left\{ \begin{bmatrix} V_{m_1} \cdot W_{m_2} \\ V_{m_1} \cdot W_{m_2} \end{bmatrix}, \begin{bmatrix} V_{m_1} \cdot W_{m_2} \\ -V_{m_1} \cdot W_{m_2} \end{bmatrix} \right\}_{m_1=1,2,\ldots,M_1; m_2=1,2,\ldots,M_2} \text{or}$$

$$\left\{ \begin{bmatrix} W_{m_2} \cdot V_{m_1} \\ W_{m_2} \cdot V_{m_1} \end{bmatrix}, \begin{bmatrix} W_{m_2} \cdot V_{m_1} \\ W_{m_2} \cdot -V_{m_1} \end{bmatrix} \right\}_{m_1=1,2,\ldots,M_1; m_2=1,2,\ldots,M_2},$$

and it may include $2M_1 M_2$ codewords. At this time, for the UE, the number of bits for returning a PMI with the rank indicator 1 is $\text{ceil}(\log_2(2M_1 M_2))$, where ceil(x) represents a minimum integer not smaller than x. A codebook with a rank indicator 2 may be represented as $$\left\{ \begin{bmatrix} V_{m_1} \cdot W_{m_2} & V_{m_1} \cdot W_{m_2} \\ V_{m_1} \cdot W_{m_2} & -V_{m_1} \cdot W_{m_2} \end{bmatrix} \right\}_{m_1=1,2,\ldots,M_1; m_2=1,2,\ldots,M_2} \text{or}$$

-continued $$\left\{ \begin{bmatrix} W_{m_2} \cdot V_{m_1} & W_{m_2} \cdot V_{m_1} \\ W_{m_2} \cdot V_{m_1} & -W_{m_2} \cdot V_{m_1} \end{bmatrix} \right\}_{m_1=1,2,\ldots,M_1; m_2=1,2,\ldots,M_2},$$

and it may include $M_1M_2$ codewords. At this time, for the UE, the number of bits for returning a PMI with the rank indicator 2 is $\text{ceil}(\log_2(M_1M_2))$, where $\text{ceil}(x)$ represents a minimum integer not smaller than x. In this example, a plurality of matrices in the sets of matrices processed through calculation (including a matrix product operation) may be taken as components of the codeword in the codebook so as to determine the codeword in the codebook, i.e., the plurality of matrices in the sets of matrices processed through calculation may be taken as elements of a block matrix so as to determine the codeword in the codebook.

The returning of the PMI will be described hereinafter.

After determining the codebook in accordance with the aforementioned methods, the UE may calculate and return the PMI in the following two modes.

Mode 1: the codewords in the determined codebook may be numbered sequentially, and the UE may return a serial number, i.e., a PMI, of a selected codeword in the entire codebook. This mode may be adapted to all the codebook determination methods. Each codeword in the codebook may also be numbered in a multi-variable array, i.e., each codeword may correspond to one or more multi-variable arrays. The UE may return each element in the multi-variable array in the form of PMI. Upon the receipt of each element in the multi-variable array from the UE, the base station may determine the corresponding codeword. A correspondence between the multi-variable arrays and the codewords needs to be agreed in advance. All elements in the multi-variable array may be returned by the UE in a joint or separate manner. The so-called "joint returning" refers to a situation where the elements in the multi-variable array are encoded jointly and then transmitted simultaneously, and the so-called "separate returning" refers to a situation where different elements in the multi-variable array are returned by the UE within different time periods.

For example, for the codeword with the rank indicator 1 in Example 9, assuming that the set of matrices includes M vectors, M is an integral multiple of 4, and Q=4. In the case that the codewords are numbered and indexed using a binary group $(n_1, n_2)$, the correspondence between the binary groups and the codewords may be shown in the following table, where $n_1$ has a value within the range from 1 to M/4, and $n_2$ has a value within the range from 1 to 16.

Mode 2: upon the selection of an optimal precoding matrix in accordance with the determined codebook, the UE may return serial numbers of matrices for determining the optimal precoding matrix in the respective sets of matrices. In other words, the UE may return a plurality of PMIs, and then the base station may generate the optimal precoding matrix using an identical method in accordance with the matrices corresponding to the plurality of PMIs returned by the UE. For example, for the codebooks in Example 6 and Example 8, the UE may return two PMIs, one of which corresponds to one vector in the first set, and the other of which corresponds to one matrix in the set of matrices including r columns (in the case that the UE has simultaneously or previously returned the rank indicator r).

The Mode 2 may also be adapted to a situation where the matrices in the set of matrices need to be returned through two or more PMIs (i.e., a situation where the PMI needs to be returned through multi-variable array in Mode 1). For example, in the case that the matrix including r columns is an 8-antenna codebook defined in the LTE protocol, the matrix itself needs two PMIs, i.e., the UE needs to return 3 PMIs simultaneously so as to determine the precoding matrix, where one of the PMIs is used to indicate one vector in the set of matrices configured by the base station for the UE, and the other two PMIs are used to indicate one matrix in the 8-antenna codebook having the rank indicator r.

It should be appreciated that, in the above methods for determining the codeword, the normalization of power is not taken into consideration. In the case that the normalization of power is to be taken into consideration, the determined codeword needs to be multiplied by a power normalization factor.

Figure 7:
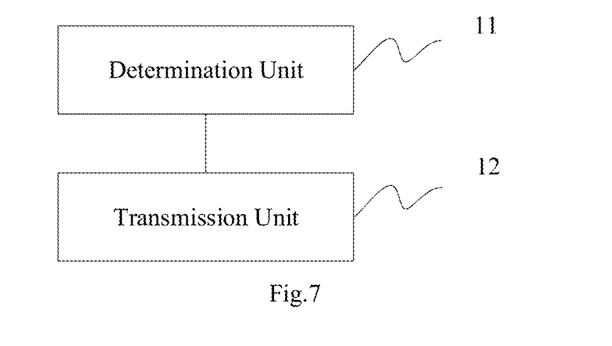
FIG. 7 is a schematic view showing a device for determining a codebook at a base station side according to one embodiment of the present disclosure.

Correspondingly, referring to FIG. 7, the present disclosure further provides in some embodiments a device for determining a codebook at a base station side, which includes: a determination unit 11 configured to configure for a UE a codebook determination parameter in accordance with an antenna array parameter adopted by a base station; and a transmission unit 12 configured to transmit the codebook determination parameter to the UE to instruct the UE to determine the codebook in accordance with the codebook determination parameter.

In a possible embodiment of the present disclosure, the code determination parameter includes information about one or more sets of matrices for determining the codebook.

In a possible embodiment of the present disclosure, the information about the one or more sets of matrices includes a value of each matrix in the set of matrices, or a relevant parameter for instructing the UE to determine each matrix in the set of matrices.

| | | | | $n_2$ | | | | |
|---|---|---|---|---|---|---|---|---|
| $n_1$ | 1 | 2 | 3 | 4 | 5 | 6 | 7 | 8 |
| 1-M/4 | $W_{4(n_1-1)+1,0}$ | $W_{4(n_1-1)+1,1}$ | $W_{4(n_1-1)+1,2}$ | $W_{4(n_1-1)+1,3}$ | $W_{4(n_1-1)+2,0}$ | $W_{4(n_1-1)+2,1}$ | $W_{4(n_1-1)+2,2}$ | $W_{4(n_1-1)+2,3}$ |

| | | | | $n_2$ | | | | |
|---|---|---|---|---|---|---|---|---|
| $n_1$ | 9 | 10 | 11 | 12 | 13 | 14 | 15 | 16 |
| 1-M/4 | $W_{4(n_1-1)+3,0}$ | $W_{4(n_1-1)+3,1}$ | $W_{4(n_1-1)+3,2}$ | $W_{4(n_1-1)+3,3}$ | $W_{4n_1,0}$ | $W_{4n_1,1}$ | $W_{4n_1,2}$ | $W_{4n_1,3}$ | wherein $W_{m,q} = \begin{bmatrix} V_m \\ \varphi_q V_m \end{bmatrix}$

In a possible embodiment of the present disclosure, the determination unit is further configured to configure for the UE the codebook determination parameter in accordance with the number of antennas and/or an arrangement mode of the antennas in the antenna array adopted by the base station.

In a possible embodiment of the present disclosure, subsequent to the transmission of the codebook determination parameter to the UE, the transmission unit is further configured to receive CSI reported by the UE, the CSI being determined by the UE in accordance with the codebook which is determined in accordance with the codebook determination parameter.

In a possible embodiment of the present disclosure, the CSI includes one or more PMIs corresponding to a precoding matrix. The precoding matrix is acquired through calculation on the matrix in the set of matrices, or acquired by taking the matrix in the set of matrices as a component, or acquired by taking the resulted matrix after calculation in the set of matrices as a component.

In a possible embodiment of the present disclosure, in the case that the resulted matrix after calculation in the set of matrices is taken as the component of the precoding matrix, the matrix in the set of matrices processed through a Kronecker product operation is taken as the component of the precoding matrix.

In a possible embodiment of the present disclosure, the base station may acquire a codeword in the codebook through calculation on the matrix in the set of matrices using a calculation rule agreed with the UE, or take the matrix in the set of matrices as a component of the codeword in the codebook, or take the resulted matrix after calculation in the set of matrices as a component of the codeword in the codebook. The codebook is a set of precoding matrices, and each element in the set is called as the codeword. The base station may establish a mapping relationship between the PMIs and the codewords in accordance with a rule agreed with the UE in advance, and determine the precoding matrix in accordance with the one or more PMIs reported by the UE and the mapping relationship.

Figure 8:
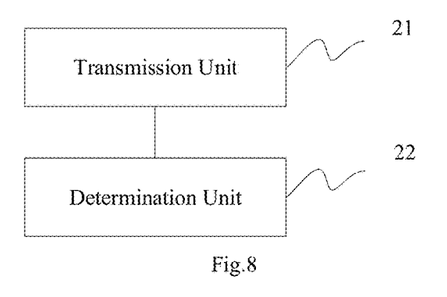
FIG. 8 is a schematic view showing a device for determining a codebook at a UE side according to one embodiment of the present disclosure.

Referring to FIG. 8, the present disclosure further provides in some embodiments a device for determining a codebook at a UE side, which includes: a transmission unit 21 configured to receive a codebook determination parameter configured in accordance with an antenna array parameter adopted by a base station; and a determination unit 22 configured to determine the codebook in accordance with the codebook determination parameter.

In a possible embodiment of the present disclosure, the code determination parameter includes information about one or more sets of matrices for determining the codebook.

In a possible embodiment of the present disclosure, the information about the one or more sets of matrices includes a value of each matrix in the set of matrices, or a relevant parameter for instructing the UE to determine each matrix in the set of matrices.

In a possible embodiment of the present disclosure, the determination unit is further configured to determine the set of matrices in accordance with the information about the set of matrices; and acquire a codeword in the codebook through calculation on a matrix in the set of matrices using a calculation rule agreed with the base station in advance, or take the matrix in the set of matrices as a component of the codeword in the codebook, or take the resulted matrix after calculation in the set of matrices as a component of the codeword in the codebook.

In a possible embodiment of the present disclosure, in the case that the resulted matrix after calculation in the set of matrices is taken by the determination unit as the component of the codeword in the codebook, the matrix in the set of matrices processed through a Kronecker product operation is taken as the component of the codeword in the codebook.

In a possible embodiment of the present disclosure, the determination unit is further configured to determine CSI in accordance with the codebook and report the CSI to the base station, the CSI including a plurality of PMIs each corresponding to one matrix.

Figure 9:
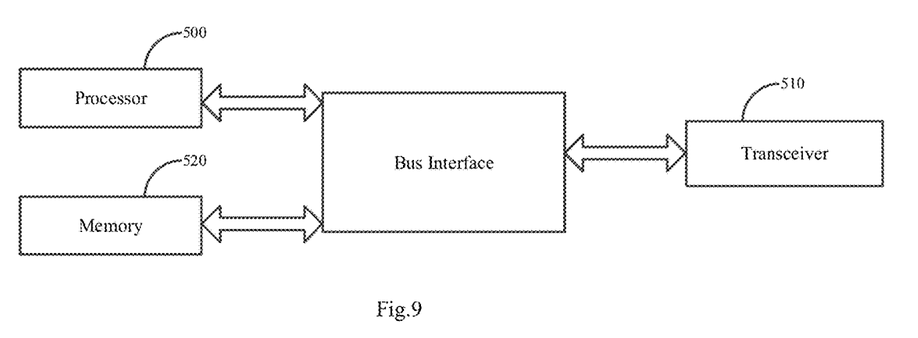
FIG. 9 is another schematic view showing the device for determining the codebook at the base station side according to one embodiment of the present disclosure.

Referring to FIG. 9, the present disclosure further provides in some embodiments a device for determining a codebook at a base station side, which includes a processor 500, a transceiver 510 and a memory 520. The processor 500 is configured to read a program stored in the memory 520, so as to configure for a UE a codebook determination parameter in accordance with an antenna array parameter adopted by a base station, and transmit, through the transceiver 510, the codebook determination parameter to the UE so as to instruct the UE to determine the codebook in accordance with the codebook determination parameter. The transceiver 510 is configured to receive and transmit data under the control of the processor 500.

In a possible embodiment of the present disclosure, the code determination parameter includes information about one or more sets of matrices for determining the codebook.

In a possible embodiment of the present disclosure, the information about the one or more sets of matrices includes a value of each matrix in the set of matrices, or a relevant parameter for instructing the UE to determine each matrix in the set of matrices.

In a possible embodiment of the present disclosure, the processor 500 is further configured to configure for the UE the codebook determination parameter in accordance with the number of antennas and/or an arrangement mode of the antennas in the antenna array adopted by the base station.

In a possible embodiment of the present disclosure, subsequent to the transmission of the codebook determination parameter to the UE, the processor 500 is further configured to receive, through the transceiver 510, CSI reported by the UE, the CSI being determined by the UE in accordance with the codebook which is determined in accordance with the codebook determination parameter.

In a possible embodiment of the present disclosure, the CSI includes one or more PMIs corresponding to a precoding matrix. The precoding matrix is acquired through calculation on the matrix in the set of matrices, or acquired by taking the matrix in the set of matrices as a component, or acquired by taking the resulted matrix after calculation in the set of matrices as a component.

In a possible embodiment of the present disclosure, in the case that the resulted matrix after calculation in the set of matrices is taken as the component of the precoding matrix, the matrix in the set of matrices processed through a Kronecker product operation is taken as the component of the precoding matrix.

In a possible embodiment of the present disclosure, the base station may acquire a codeword in the codebook through calculation on the matrix in the set of matrices using a calculation rule agreed with the UE, or take the matrix in the set of matrices as a component of the codeword in the codebook, or take the resulted matrix after calculation in the set of matrices as a component of the codeword in the codebook. The codebook is a set of precoding matrices, and each element in the set is called as the codeword. The base station may establish a mapping relationship between the PMIs and the codewords in accordance with a rule agreed with the UE in advance, and determine the precoding matrix in accordance with the one or more PMIs reported by the UE and the mapping relationship.

In FIG. 9, bus architecture may include a number of buses and bridges connected to each other, so as to connect various circuits for one or more processors 500 and one or more memories 520. In addition, as is known in the art, the bus architecture may be used to connect any other circuits, such as a circuit for a peripheral device, a circuit for a voltage stabilizer and a power management circuit. Bus interfaces are provided, and the transceiver 510 may consist of a plurality of elements, i.e., a transmitter and a receiver for communication with any other devices over a transmission medium. The processor 500 may take charge of managing the bus architecture as well as general processings. The memory 520 may store therein data for the operation of the processor 500.

Figure 10:
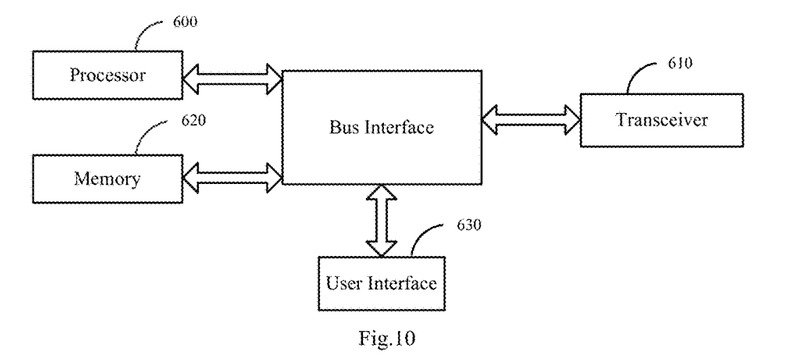
FIG. 10 is another schematic view showing the device for determining the codebook at the UE side according to one embodiment of the present disclosure.

Referring to FIG. 10, the present disclosure further provides in some embodiments a device for determining a codebook at a UE side, which includes a processor 600, a transceiver 610 and a memory 620. The processor 600 is configured to read a program stored in the memory 620, so as to receive a codebook determination parameter configured in accordance with an antenna array parameter adopted by a base station, and determine the codebook in accordance with the codebook determination parameter. The transceiver 610 is configured to receive and transmit data under the control of the processor 600.

In a possible embodiment of the present disclosure, the code determination parameter includes information about one or more sets of matrices for determining the codebook.

In a possible embodiment of the present disclosure, the information about the one or more sets of matrices includes a value of each matrix in the set of matrices, or a relevant parameter for instructing the UE to determine each matrix in the set of matrices.

In a possible embodiment of the present disclosure, the processor 600 is further configured to determine the set of matrices in accordance with the information about the set of matrices; and acquire a codeword in the codebook through calculation on a matrix in the set of matrices using a calculation rule agreed with the base station in advance, or take the matrix in the set of matrices as a component of the codeword in the codebook, or take the resulted matrix after calculation in the set of matrices as a component of the codeword in the codebook.

In a possible embodiment of the present disclosure, in the case that the resulted matrix after calculation in the set of matrices is taken by the processor 600 as the component of the codeword in the codebook, the matrix in the set of matrices processed through a Kronecker product operation is taken as the component of the codeword in the codebook.

In a possible embodiment of the present disclosure, the processor 600 is further configured to determine CSI in accordance with the codebook and report, through the transceiver 610, the CSI to the base station, the CSI including a plurality of PMIs each corresponding to one matrix.

In FIG. 10, bus architecture may include a number of buses and bridges connected to each other, so as to connect various circuits for one or more processors 600 and one or more memories 620. In addition, as is known in the art, the bus architecture may be used to connect any other circuits, such as a circuit for a peripheral device, a circuit for a voltage stabilizer and a power management circuit. Bus interfaces are provided, and the transceiver 610 may consist of a plurality of elements, i.e., a transmitter and a receiver for communication with any other devices over a transmission medium. With respect to different UEs, a user interface 630 may also be provided for devices which are to be arranged inside or outside the UE, and these devices may include but not limited to a keypad, a display, a speaker, a microphone and a joystick. The processor 600 may take charge of managing the bus architecture as well general processings. The memory 620 may store data desired for the operation of the processor 600.

The device for determining the codebook may be a base station or a UE.

According to the embodiments of the present disclosure, the base station may configure for the UE a plurality of sets of matrices, and the UE and the base station may determine the codebook in accordance with the sets of matrices using an identical method, so as to return the CSI. Hence, the schemes in the embodiments of the present disclosure may be adapted to various antenna array forms, and meanwhile it is able to keep the overhead for configuring and storing the codebooks at a comparatively low level.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for determining a codebook, comprising steps of:
configuring for a User Equipment (UE) a codebook determination parameter in accordance with an antenna array parameter adopted by a base station; and
transmitting the configured codebook determination parameter to the UE to instruct the UE to determine the codebook in accordance with the codebook determination parameter,
wherein the step of configuring for the UE the codebook determination parameter in accordance with the antenna array parameter adopted by the base station comprises configuring for the UE the codebook determination parameter in accordance with the number of antennas and an arrangement mode of the antennas in the antenna array adopted by the base station.

2. The method according to claim 1, wherein the configured codebook determination parameter comprises information about one or more sets of matrices for determining the codebook.

3. The method according to claim 2, wherein the information about the one or more sets of matrices comprises a value of each matrix in the set of matrices, or a relevant parameter for instructing the UE to determine each matrix in the set of matrices.

4. The method according to claim 1, wherein subsequent to the step of transmitting the configured codebook determination parameter to the UE, the method further comprises receiving Channel State Information (CSI) reported by the UE, the CSI being determined by the UE in accordance with the codebook which is determined in accordance with the codebook determination parameter.

5. The method according to claim 4, wherein the CSI comprises one or more Precoding Matrix Indicators (PMIs) corresponding to a precoding matrix; and the precoding matrix is acquired through calculation on matrix in a set of matrices, or acquired by taking the matrix in the set of matrices as a component, or acquired by taking a resulted matrix after calculation in the set of matrices as the component.

6. The method according to claim 5, wherein in the case that the resulted matrix after calculation in the set of matrices is taken as the component of the precoding matrix, the matrix in the set of matrices processed through a Kronecker product operation is taken as the component of the precoding matrix.

7. A method for determining a codebook, comprising steps of:
receiving a codebook determination parameter configured in accordance with an antenna array parameter adopted by a base station; and
determining the codebook in accordance with the received, configured codebook determination parameter,
wherein the codebook determination parameter is configured for a User Equipment (UE) in accordance with the number of antennas and an arrangement mode of the antennas in an antenna array adopted by the base station.

8. The method according to claim 7, wherein the received, configured codebook determination parameter comprises information about one or more sets of matrices for determining the codebook.

9. The method according to claim 8, wherein the information about the one or more sets of matrices comprises a value of each matrix in the set of matrices, or a relevant parameter for instructing the UE to determine each matrix in the set of matrices.

10. The method according to claim 8, wherein the step of determining the codebook in accordance with the codebook determination parameter comprises:
determining the set of matrices in accordance with the information about the set of matrices; and
acquiring a codeword in the codebook through calculation on a matrix in the set of matrices using a calculation rule agreed with the base station in advance, or taking the matrix in the set of matrices as a component of the codeword in the codebook, or taking a resulted matrix after calculation in the set of matrices as a component of the codeword in the codebook.

11. The method according to claim 10, wherein in the case that the resulted matrix after calculation in the set of matrices is taken as the component of the codeword in the codebook, the matrix in the set of matrices processed through a Kronecker product operation is taken as the component of the codeword in the codebook.

12. The method according to claim 8, further comprising determining Channel State Information (CSI) in accordance with the codebook and reporting the CSI to the base station, wherein the CSI comprises a plurality of PMIs each corresponding to one matrix.

13. A device for determining a codebook, comprising: a processor, a transceiver and a memory, wherein the transceiver is configured to receive and transmit data under control of the processor, and the processor is configured to read a program stored in the memory to:
receive a codebook determination parameter configured in accordance with an antenna array parameter adopted by a base station; and
determine the codebook in accordance with the received, configured codebook determination parameter,
wherein the codebook determination parameter is configured for a User Equipment (UE) in accordance with the number of antennas and an arrangement mode of the antennas in an antenna array adopted by the base station.

14. The device according to claim 13, wherein the code received, configured codebook determination parameter comprises information about one or more sets of matrices for determining the codebook.

15. The device according to claim 14, wherein the information about the one or more sets of matrices comprises a value of each matrix in the set of matrices, or a relevant parameter for instructing the UE to determine each matrix in the set of matrices.

16. The device according to claim 14, wherein the processor is further configured to read the program stored in the memory to: determine the set of matrices in accordance with the information about the set of matrices; and acquire a codeword in the codebook through calculation on a matrix in the set of matrices using a calculation rule agreed with the base station in advance, or take the matrix in the set of matrices as a component of the codeword in the codebook, or take a resulted matrix after calculation in the set of matrices as a component of the codeword in the codebook.

17. The device according to claim 16, wherein in the case that the resulted matrix after calculation in the set of matrices is taken by the processor as the component of the codeword in the codebook, the matrix in the set of matrices processed through a Kronecker product operation is taken as the component of the codeword in the codebook.

18. The device according to claim 14, the processor is further configured to read the program stored in the memory to: determine Channel State Information (CSI) in accordance with the codebook and report the CSI to the base station, and the CSI comprises a plurality of PMIs each corresponding to one matrix.

* * * * *